2,913,329
PROCESS FOR THE MANUFACTURE OF COMPLEX FERTILIZERS

Karl Geiersberger, Koln-Deutz, and Hugo Nees, Koln-Bruck, Germany, assignors to Chemische Fabrik Kalk G.m.b.H., Koln-Kalk, Germany No Drawing. Application October 15, 1956
Serial No. 615,746

Claims priority, application Germany October 19, 1955

3 Claims. (Cl. 71—37)

In the ammoniation of disintegration mixtures, such as are obtained by the disintegration of raw phosphates with nitric acid (50 to 60%) in conjunction with sulphuric acid (70 to 98%), whereby to 1 molecule $P_2O_5$ about 2 to 5 molecules $HNO_3$ and about 2.5 to 1 molecule $H_2SO_4$ are employed, considerable difficulty occurs in that as the ammoniation progresses the reaction mixture thickens continually due to a jell formation commencing at a pH value of about 3.5 to 4, so that towards the end of the ammoniation process putty-like masses are obtained. Such masses are extremely difficult to work mechanically and only reluctantly absorb the ammonia. It has been endeavoured to overcome these difficulties by means of apparatus, using mixing and kneading apparatus of different types during the ammoniation process. Such apparatus, however, requires a considerable amount of power and, if successful at all, is only so to a limited extent. It has likewise been proposed to render the ammoniation mixture more easily workable by increasing its water-content to about 40 to 50%, either by using more diluted acids than those mentioned above or by adding water directly to the ammoniation mixture. Such a measure is, however, uneconomical owing to the additional quantities of water which have to be evaporated off during the drying of the reaction mixture, and moreover necessitate an increase in the volume of the ammoniation and drying apparatus or a reduction in the capacity of the plant. Assuming that the drying of a mixture with such a high water-content is carried out in rotary drums or similar apparatus with the addition of dried fine material from the final stage of the process, known as "fines," the quantity thereof must be increased to many times the quantity which is required in the case of ammoniation mixtures to which no water has been added.

A process has now been discovered wherein the jell-formation causing the thickening of the ammoniation mixture is so effectively suppressed by chemical means that good flowing mixtures are obtained which easily absorb ammonia even in the end phase of the ammoniation process.

In the process according to the invention the ammoniation of the reaction mixtures which are obtained by the disintegration of raw phosphates with nitric acid (about 50 to 60%) together with sulphuric acid (about 70 to 98%), whereby to 1 molecule $P_2O_5$ there are about 2 to 5 molecules $HNO_3$ and about 2.5 to 1 molecule $H_2SO_4$, is carried out in several, preferably two to four stirring vessels of normal construction connected up in series and through which the reaction mixture is flowing. During the ammoniation process certain pH values are constantly maintained in the vessels by suitably regulating the ammonia feed. The important feature of the process according to the invention is that the pH in the next to the last vessel is maintained at 3.5 to 4 and in the last vessel at 6 to 7. Thus in the process according to the invention the range between pH 3.5 or 4 and pH 6 or 7 is skipped. The temperature of the reaction mixture is maintained at 95 to 110° C. during the ammoniation process.

The idea on which the invention is based is that from a pH value of about 3.5 onwards the jell formation, which makes itself apparent in a detrimental manner, is prevented or suppressed as a result of the formation of O-bridges of the aquo- and hydroxo-groups of the nascent calcium salts, e.g. $CaSO_4$ or $CaHPO_4$, and of the three or four valence ions of Fe, Al and Si forming the impurities. This is attained according to the invention by setting the greatest possible difference in the OH-activity in the reaction mixture in the last but one and last ammoniation vessels.

It has also been found advantageous to add an electrolyte to the ammoniating mixture in the last but one or/and the last vessel. It is obvious that such an addition will considerably impede the jell-formation which would occur in the pH region between 3.5 and 6.5 when carrying out the ammoniation process in the known manner. In this respect the addition of dried material from the final step of the process with oversized or undersized grain (fines) has proved advantageous. This over or undersized material is introduced into the first or/and second ammoniation vessel in such quantities that the added quantity amounts to about half to twice the weight of the reaction mixture.

When producing NPK fertilizers, the electrolyte can be added in the process according to the invention in the form of the potassium salt required in any case, whereby the whole quantity of potassium salt necessary for adjusting the desired NPK ratio in the finished product can be added or a portion of this quantity, but it must be at least so much that a molecular ratio of $K_2O:P_2O_5=0.5$ is always present in the ammoniation mixture in the next to last or the last vessel. The $K_2O$ addition is preferably in the form of commercial KCl. The potassium salt can also be introduced together with the "fines" into the next to the last vessel.

A neutral ammoniation mixture, which is obtained by ammoniating a reaction mixture in the production of which to every 1 molecule $P_2O_5$ 3.5 molecules $HNO_3$ (50 to 60%) together with 1.7 molecules $H_2SO_4$ (70 to 98%) were used, contains about 18 to 20% water. If twice the quantity of "fines" is added to such a mixture, the water content in the mixture drops to below 10%. In spite of this low water content, the mixture retains its good fluidity if, according to the invention, the pH range between 3.5 to 4 and 6 or 7 is skipped in the ammoniating process. If, however, a smaller pH range than that mentioned above were to be skipped, so that, for example, when using three ammoniating vessels, a pH value of about 5 is maintained in the middle vessel, the mixture even without the addition of "fines" to the reaction mixture, which as above stated has a water content of about 18 to 20%, would thicken to such an extent that the mass could only be worked with kneading apparatus using a much higher consumption of power.

The process according to the invention is preferably started in such a manner that a water content which is twice as that adjusted in the mixture in the course of the process by the water introduced by the disintegrating acids, is maintained in the ammoniating mixture in the next to the last vessel until the pH in the said vessel is 3.5 to 4 and in the last vessel 6 to 7. The supplementary water can be added to the mixture before or after it has entered the mentioned vessel.

Another mode of starting the process according to the invention consists in producing in or introducing into the last ammoniation vessel a mash of finished fertilizer ("fines") and water, the composition of this mash corresponding to the ammoniating mixture formed in the last vessel in the course of the process.

A process for the production of complex fertilizers by the disintegration of raw phosphate with nitric acid and subsequent neutralization of the disintegration mass with ammonia has recently become known, whereby a potassium salt is added to the mixture before a pH value of about 5 is reached, preferably in a proportion of about 20 to 50% of the quantity of raw phosphate used (see German patent application G 13 554 IVb/16). The process according to the invention differs very considerably from this known process. Whereas in the known process the disintegration is carried out in accordance with the examples given in the above-mentioned application with such quantities of nitric acid that for 1 molecule $P_2O_5$ there are about 6.3 molecules $HNO_3$, a certain quantity of sulphuric acid being also added, if desired, in the course of the ammoniation for the purpose of fixing the calcium in the calcium nitrate, in the process according to the invention the disintegration of the raw phosphate is carried out with nitric acid together with sulphuric acid. Since the amount of nitric acid applied in the process according to this invention is too small to carry the disintegration through to monocalciumphosphate or to free phosphoric acid, it is absolutely essential to add sulphuric acid to the disintegration mixture so that the sulphuric acid primarily exerts a disintegrating effect and secondly an effect fixing the calcium.

In spite of the large quantity of calcium sulphate resulting therefrom, which, as is known, would otherwise lead to thickening in the ammoniation of such reaction mixtures, and in spite of the small quantities of water in comparison with that of a reaction mixture which is produced solely with nitric acid and raw rock phosphate, good fluid ammoniation mixtures are obtained by the process according to the invention.

Another important difference between the process according to the invention and the previously known process consists in that in the latter the ammoniation mixture passes gradually through all pH stages (without any steps or gaps) until the neutral stage is reached, whereas in the process according to the invention the stage between pH 3.5 to 4 and 6 to 7 is jumped during the ammoniation process. This measure is of fundamental importance for the success of the process according to the invention, because, if the said pH range is not jumped, a thickening of the ammoniation mixture would occur in respect of the concentrations and mixing proportions of the acids used, even if a potassium salt is added. For example it is not possible, as in the known process, to attain a pH value of 5 without the ammoniation mixture thickening. Such thickening is avoided by the sudden rise in pH above described.

Another feature of the process according to the invention, according to which a potassium salt is added to the reaction mixture at pH values of 3.5 to 4 or also 6 to 7, represents a supplementary measure.

An advantage resulting from the process according to the invention as regards the disintegration, consists in that the sulphuric acid usually employed for the disintegration of the raw phosphate can be partly or entirely replaced by cheaper waste sulphuric acid such as occurs, for example, in the nitration processes. A particularly strong gel formation almost always takes place in the reaction mixture when disintegration mixtures are used which are obtained by the disintegration of rock phosphates with nitric acid together with waste sulphuric acid. This, however, has no detrimental effect in the process according to the invention, because the jellification is effectively suppressed.

Another advantage of the process according to the invention consists in that the power expended for thoroughly mixing the contents of the vessels during the ammoniation stage, is only a fraction of that which would be necessary if it were attempted to overcome the difficulties resulting from the thickening of the reaction mixture merely by means of apparatus, for example, by using specially constructed kneading devices.

The process according to the invention likewise has a favorable effect as regards the water economy. If it were endeavoured to obtain a workable ammoniation mixture in the apparatus used for carrying out the process according to the invention without employing the measures according to the invention, the water content of the mixture would have to be twice as high as in the mixtures actually used in the process according to the invention, that is the water content in the mixture would amount to 40 to 50% instead of 10 to 20%.

The process according to the invention can be carried out continuously or in batches, but the continuous process is preferred.

*Examples*

(1) A reaction mixture is ammoniated which is obtained by the disintegration of 100 parts by weight of Morocco phosphate (33% $P_2O_5$) with 136 parts by weight of nitric acid (54%) and 47 parts by weight of sulphuric acid (78%). The ammoniating apparatus consists of two conventional stirring vessels arranged in series. The process is carried out in such a manner that a slurry consisting of about 80 parts by weight of final product and 20 parts by weight of water is first charged into the second vessel. The disintegration mixture charged into the first vessel is brought to a pH value of 3.7 by the introduction of ammonia and then flows into the second vessel wherein the pH is brought to 6.8 by introducing ammonia. These pH values are maintained in the further course of the process whereby the reaction mixture is flowing through the two vessels. At the same time over- or undersized grains obtained during the sifting of the final product are recycled into the first vessel. This recycled material is introduced in such quantities that there are 100 parts by weight to 100 parts by weight of reaction mixture. Alternatively or in addition the recycled material can be introduced into the second vessel. Ammoniation temperature about 106° C. To the ammoniation mixture in the first vessel 86 parts by weight of potassium chloride (58% $K_2O$) to 100 parts by weight of rock phosphate are added. The potassium salt can also be added in the second vessel.

The mixture thus obtained is granulated and dried in known manner, a complex fertilizer being produced containing:

| | Percent |
|---|---|
| N total | 9.97 |
| $P_2O_5$ total | 10.08 |
| $P_2O_5$-citrate-soluble | 9.89 |
| $K_2O$ | 15.10 |

(2) A disintegration mixture is ammoniated which is produced by treating 100 parts by weight cola-apatite (38% $P_2O_5$) with 156 parts by weight nitric acid (54%) and 33.5 parts by weight sulphuric acid (80%).

The same ammoniating apparatus is used as in Example 1. The process is carried out in a similar manner to that of Example 1. By suitably regulating the feed of ammonia a pH of 3.9 is maintained in the first vessel and of 6.8 in the second vessel while the ammoniation mixture is flowing through both vessels. At the same time 98 parts by weight of potassium chloride (58% $K_2O$) to 100 parts by weight of rock phosphate are added in the first vessel. The temperature during the ammonation process is 100 to 105° C. Final product as defined in Example 1 is recycled into the second vessel in a quantity equal to twice the weight of the reaction mixture therein. The mixture obtained is granulated and dried in known manner. A complex fertilizer is produced containing:

| | Percent |
|---|---|
| N total | 11.02 |
| $P_2O_5$ total | 11.20 |
| $P_2O_5$-citrate-soluble | 10.97 |
| $K_2O$ | 16.38 |

(3) A disintegration mixture is ammoniated which is obtained by treating 100 parts by weight of Morocco phosphate (33% $P_2O_5$) with 54 parts by weight of nitric acid (55%) and 68 parts by weight sulphuric acid (70%).

The ammonation apparatus used is the same as that used in Example 1. The disintegration mixture is ammoniated to pH 3.5 in the first vessel and at the same time to every 100 parts by weight of the raw phosphate charge 45 parts by weight of water and 38 parts by weight of potassium chloride (58% $K_2O$) are added. The mixture is conducted into the second vessel and ammoniated to pH 6.5. At the same time 48 parts by weight of potassium chloride (58% $K_2O$) are introduced into the mixture in the second vessel for very 100 parts by weight of raw phosphate charge. The additional water feed is cut off after both ammoniating vessels have been once fully charged. In the further course of the process, during which the reaction mixture flows continuously through the ammoniation vessels, the above-mentioned pH values are maintained. Likewise the above-mentioned quantity of potassium is continuously introduced into the second vessel. The ammoniation temperature is 106 to 110° C. Into the reaction mixture in the second vessel so much recycled material is introduced that there are 50 parts by weight of recycled material to 100 parts by weight of ammoniation mixture. The mixture is then granulated and dried in known manner, a complex fertilizer being obtained containing:

| | Percent |
|---|---|
| N total | 6.01 |
| $P_2O_5$ total | 12.12 |
| $P_2O_5$ citrate-soluble | 11.97 |
| $K_2O$ | 18.28 |

The scope of protection of the present application for patent is not exceeded if prior to or during the ammoniation stage phosphoric acid or phosphoric ammonium or potassium salts are added to the reaction mixture so as to adjust a certain proportion of the basic nutrients and also a certain favorable $CaO/P_2O_5$ ratio in the final products.

We claim:

1. In the process for the production of complex fertilizers consisting in disintegrating raw phosphates with nitric acid (50–60%) together with sulphuric acid (70–98%), wherein for each 1 molecule of $P_2O_5$ present in the raw phosphate, 2 to 5 molecules $HNO_3$ and 2.5 to 1 molecules $H_2SO_4$ are used, subsequently ammoniating the reaction mixture at temperatures between 95 and 110° C. in a plurality of stirring vessels connected up in series, adding ammonia into the mixtures in said stirring vessels in such amounts that a pH-value in the range of 3.5 to 4 is maintained in the next to the last vessel, and a pH-value of 6.0 to 7.0 is maintained in the last vessel, and discharging the mixture from the next to the last vessel directly into the last vessel while maintaining the pH-value in the last vessel between 6.0 and 7.0 and thus abruptly raising the added mixture to the same pH.

2. Process as set forth in claim 1, wherein abnormally sized grains obtained during the sifting of the final product are recycled into the ammoniation mixture in one of the two last vessels in a proportion which is between one half and twice as much as the quantity of the ammoniation mixture therein.

3. Process as set forth in claim 1, wherein when producing NPK fertilizers at least a portion of the total quantity of potassium salt required is introduced in one of the last two vessels so that the molecular ratio of $K_2O/P_2O_5$ in the ammoniation mixture is constant at 0.5.

References Cited in the file of this patent

UNITED STATES PATENTS

| 2,707,676 | Picot et al. | May 3, 1955 |
| 2,726,649 | Andres et al. | Dec. 13, 1955 |
| 2,738,265 | Nielsson | Mar. 3, 1956 |
| 2,792,286 | Wordie et al. | May 14, 1957 |